April 6, 1965 R. B. ASHLEY 3,177,438

DEFLECTION CIRCUIT ARRANGEMENT

Filed March 6, 1963

INVENTOR:
ROBERT B. ASHLEY.

BY Frank J. Thompson

HIS ATTORNEY.

United States Patent Office 3,177,438
Patented Apr. 6, 1965

3,177,438

DEFLECTION CIRCUIT ARRANGEMENT

Robert B. Ashley, North Syracuse, N.Y., assignor to General Electric Company, a corporation of New York Filed Mar. 6, 1963, Ser. No. 263,276
5 Claims. (Cl. 330—10)

This invention relates to circuit arrangements of the type for generating a high level deflection voltage and more particularly to an improved circuit arrangement for generating the desired deflection voltage.

In some electron-beam display devices a sawtooth voltage of several thousand volts and having a vertical deflection frequency $f_1$ is required for providing deflection of the electron beam. A system for generating the required high-level sawtooth voltage is shown and described in copending application Serial No. 122,711, filed July 10, 1961 and assigned to the assignee of the present invention.

In the aforesaid application, a first signal of relatively low vertical deflection frequency $f_1$ and sawtooth waveform and a second signal of relatively higher horizontal deflection frequency $f_2$ are coupled to a signal generating circuit means comprising a pair of amplifying devices, and a transformer including primary and secondary windings with a large voltage step-up ratio therebetween. The signal generating circuit means is arranged in a manner for generating in the primary winding a signal of frequency $f_2$ having an envelope corresponding to the waveform of the first signal. Detection circuit means are coupled to the secondary winding for providing a high level output voltage of frequency $f_1$ and sawtooth waveform.

Although this high-level sawtooth voltage generating system provides good operating performance, it is a relatively expensive circuit arrangement in that two amplifying devices are utilized.

In the present invention, a circuit arrangement is provided for generating the desired high-level deflection voltage which utilizes signal generating circuit means requiring only a single amplifying device.

Accordingly, it is an object of this invention to provide an improved circuit arrangement for generating a high level deflection voltage of desired waveform.

Another object of this invention is to provide an improved, relatively simple, and economical transistorized circuit arrangement for generating a high level deflection voltage.

In carrying out this invention, in one form thereof, a source of a first signal of vertical deflection frequency $f_1$ and desired waveform and a source of a second signal of relatively higher horizontal deflection frequency $f_2$ are provided. A signal generating circuit means is provided having a single amplifying device and a transformer having primary and secondary windings which are wound for providing a large voltage step-up from primary to secondary winding. Means to couple the first signal to a first electrode of the amplifying device and the second signal to a second electrode of the amplifying device. The signal generating circuit means is arranged in a manner for generating in the primary winding a signal having a frequency $f_2$ and an envelope corresponding to the waveform of the first signal. Detection circuit means are coupled to the secondary winding for providing a high level output voltage of frequency $f_1$.

While the specification concludes with claims particularly pointing out and distinctly claiming the subject matter of the invention, it is believed that the invention will be better comprehended from the following description taken in connection with the accompanying drawings:

Figure 1:
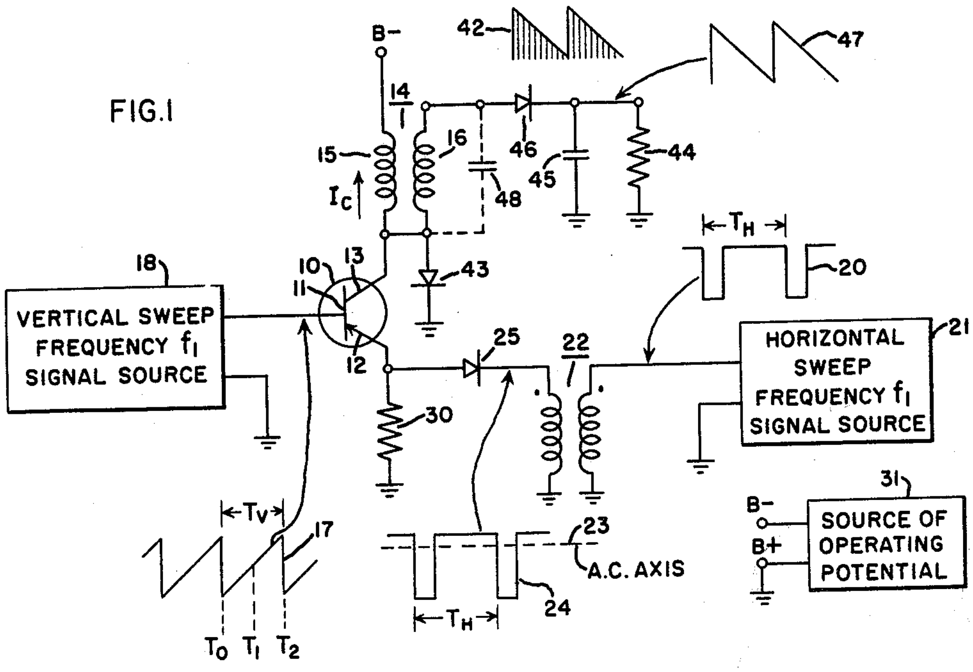
FIGURE 1 is a schematic circuit diagram of a deflection circuit arrangement embodying the present invention.

Referring now to FIGURE 1, the deflection circuit arrangement includes a signal generating circuit means comprising a single transistor amplifying device 10 having a base electrode 11, an emitter electrode 12 and a collector electrode 13, and a transformer 14 having primary and secondary windings 15 and 16 respectively. A first signal 17 of frequency $f_1$ and period $T_v$, which may be a 60 c.p.s. vertical sweep signal of a television receiving apparatus is derived from a suitable source 18, which may be a conventional multivibrator or blocking oscillator, and is applied to the base electrode 11 of transistor 10.

A second signal 20 of frequency $f_2$ and period $T_h$ is provided by a source 21 and coupled via a transformer 22 to the emitter electrode 12. The second signal may be derived from the horizontal sweep system of a television receiving apparatus and may consist of horizontal synchronizing pulses or horizontal flyback pulses, both of which have a repetition frequency $f_2$ of 15,750 c.p.s. The transformer 22 is an impedance matching transformer and is selected to provide an impedance match between a relatively higher impedance of the signal source 21 and the relatively lower impedance seen looking into the emitter electrode circuit of transistor 10. Since the transformer 22 provides A.C. coupling, the emitter 12 could undesirably be driven positive with respect to an A.C. axis 23 of a coupled waveform 24. For inhibiting positive drive at the emitter, a diode 25 is coupled in series with a secondary winding of transformer 22 and insures that only negative segments of the coupled waveform 24 are coupled to the emitter electrode.

The transistor 10 is suitably biased by a resistor 30 which is connected between emitter 12 and ground potential. A (B−) terminal of a source of operating potential 31 is connected to the collector electrode 13 via the primary winding 15 of the transformer 14. Transformer 14 is a step-up transformer having a relatively high turns ratio from the primary winding 15 to the secondary winding 16, for example 1:100.

A signal is generated in the primary winding of the signal generating means, as described in detail hereinafter, and has a frequency $f_2$ and waveform corresponding to the waveform of the first signal. This signal is stepped-up in voltage by the transformer 14 to provide in the secondary circuit a high voltage signal 42. A diode 43 is coupled between the junction of the primary winding 15 and the secondary winding 16 and ground potential for eliminating undesired alternations of a ringing voltage in the signal generated in the primary winding 15. The signal 42 is applied to detection circuit means comprising a resistance 44, capacitance 45 and a diode 46. Resistance 44 and capacitance 45 may include input resistive and capacitive components respectively of an electron-beam display device. The detector circuit filters the frequency $f_2$ to provide a high voltage output signal 47 on the order of several thousand volts of frequency $f_1$ and having a wave shape corresponding to the waveform of the first signal.

Figure 2:
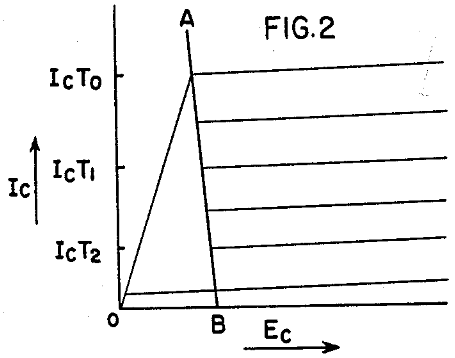
FIGURE 2 is a graph of the collector electrode characteristics of a transistor amplifying device which is utilized in the circuit arrangement of FIGURE 1.

The operation of the circuit arrangement of FIGURE 1 may be understood from the following description. A resistive load impedance is provided for the transistor 10 by the emitter resistor 30 and the resistance of the primary winding 15 of transformer 14. The sum of this resistive impedance is relatively small and provides an almost vertical load line for the transistor as indicated by load line A–B in FIGURE 2. In FIGURE 2, the collector current of transistor 10 is plotted along the ordinate and collector voltage along the abscissa. When the base electrode 11 of transistor 10 is driven negative as for example at time $T_o$ of the sawtooth waveform 17 corresponding to the negative-most excursion of the sawtooth wave 17, collector current $I_C$ will be a maximum as indicated at $I_C$ ($T_o$) in FIGURE 2. As the sawtooth wave progresses along a trace segment of its waveform from time $T_o$, the collector current decreases as indicated in FIGURE 2 along the load line A–B to a value of $I_C$ ($T_1$) and $I_C$ ($T_2$) corresponding to time $T_1$ and $T_2$ respectively. During this same period $T_v$ negative impulses of the signal 24 which are coupled to emitter electrode 12 periodically drive the transistor 10 into the collector current cut-off region of the characteristic curve for the duration of each impulse.

Figure 3:
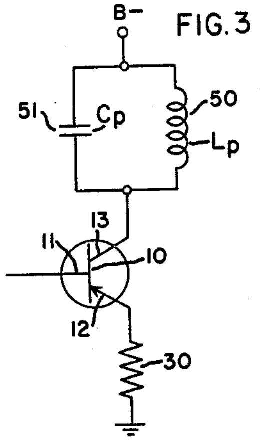
FIGURE 3 is a schematic representation of an equivalent load circuit for the transistor amplifying device utilized in FIGURE 1.
Figure 4:
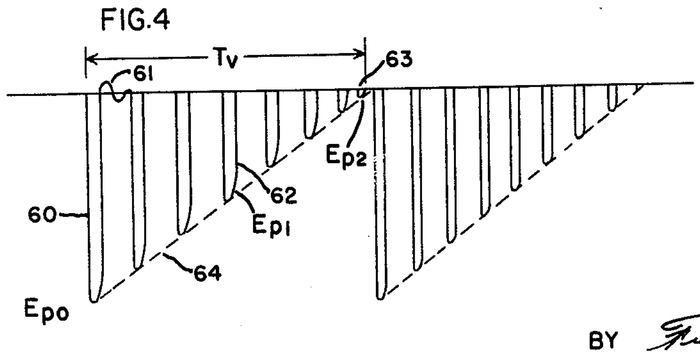
FIGURE 4 is a diagram of a signal developed across the equivalent load circuit of FIGURE 3.

The transistor 14 in the collector circuit of transistor 10 includes a substantial distributed capacitance, as represented in FIGURE 1 by capacitance 48. This capacitance in conjunction with the impedance of the primary winding 15 and the impedance reflected into the primary winding 15 from the secondary winding 16 forms an equivalent load circuit for transistor 10. In FIGURE 3, the equivalent load circuit of transistor 10 is shown comprising a parallel tank circuit having an inductance $L_p$ and capacitance $C_p$, represented by 50 and 51 respectively and corresponding to the equivalent inductance and capacitance of the transformer primary winding 15 including the reflected impedance of secondary winding 16. Resistive components which are relatively very low in value are omitted from the tank circuit of FIGURE 3 for simplification of the explanation. An initial current $I_C$, having an amplitude determined by the position of the operating point of the transistor on the load line A–B, flows in the inductance 50 and establishes a field therein. When the transistor 10 is cut-off by a negative impulse of the signal 20, the established field of inductance 50 collapses causing the resonant circuit to ring and to generate a signal in the primary winding, such as the signal 60 shown in FIGURE 4. The amplitude or magnitude of this signal is approximately $E_p=I_c\ (L_p/C_p)^{1/2}$, where $I_c$ is the initial current in the primary winding 15 at the instant the horizontal pulse drives the transistor to collector current cut-off. Thus, the signal amplitude is a function of $I_c$ which in turn is a function of the amplitude of the first signal.

The pulse width of signal 60 is determined by the resonant frequency of the tank circuit comprising inductance $L_p$ and capacitance $C_p$. Because a signal of relatively high frequency $f_2$ is generated in the primary winding, the signal 60 is easily transmitted by the transformer 14 with little attenuation. The transformer 14 advantageously requires a low frequency response suitable for passing without distortion a frequency $f_2$ rather than the frequency $f_1$. This signal is stepped-up in voltage amplitude by the transformer 14 and coupled to the detection circuit wherein the envelope of the signal 60 is detected to provide a high-level deflection voltage of sawtooth waveform.

When the tank circuit is caused to ring, a positive alternation of the ringing voltage, such as that shown at 61, may occur following signal 60. The positive alternation 61 is undesirable and is damped out by the low forward impedance of diode 43.

Subsequent to the termination of the impulse of the second signal at the emitter electrode 12, the transistor 10 will again conduct and its operative point will descend along the load line down from point A toward point B in accordance with the trace segment of waveform 17. When a succeeding impulse of the second signal occurs, as for example at $I_c$ ($T_1$), less initial current $I_c$ is flowing in the primary winding 15 of transformer 14 than at time $T_o$. Consequently, less energy exists in the tank circuit and a smaller amplitude signal will be generated in the primary winding, such as 62 designated as $E_{p1}$ in FIGURE 4. Similar operation occurs at time $T_2$ and an even smaller signal 63 designated as $E_{p2}$ is generated. Thus, a signal of successively decreasing amplitude is generated in the primary winding having an envelope corresponding to the sawtooth waveform of the first signal as indicated by the dotted line 64 in FIGURE 4.

The detection network comprising resistance 44, capacitance 45 and diode 46 integrates the signal in the secondary winding 16 to provide a relatively low-frequency $f_1$, high voltage sawtooth waveform 42. Thus, a circuit arrangement has been provided utilizing only a single transistor for generating a high voltage signal at a relatively low frequency $f_1$, while simultaneously avoiding the necessity of providing a transformer having the very large inductance normally necessary to maintain the low frequency response required for transmitting the frequency $f_1$.

Although electrostatic deflection systems generally require a highly linear sawtooth deflection voltage, some electron-beam display devices require a sawtooth deflection voltage having a waveform with a trace segment which is slightly parabolic rather than linear. A wave shaping network may be provided in the base-emitter circuit of transistor 10 to develop an input waveform having a desired parabolic trace segment.

Although a particular embodiment of the subject invention has been described, many modifications may be made, and it is intended by the appended claims to cover all such modifications which fall within the true spirit and scope of the invention.

What I claim as new and desire to secure by Letters Patent of the United States is:

1. A circuit arrangement for generating a high level deflection voltage of relatively low frequency comprising:
   - (*a*) a first source of a first electrical signal of frequency $f_1$ and desired waveform;
   - (*b*) a second source of second electrical signal of relatively higher frequency $f_2$;
   - (*c*) electrical signal generating circuit means comprising a single amplifying device having first and second input electrodes and an output electrode and a transformer having primary and secondary windings;
   - (*d*) said transformer wound for providing a voltage step-up from said primary to secondary winding and having said primary winding connected to said output electrode;
   - (*e*) means connecting said first source to said first input electrode and said second source to said second input electrode;
   - (*f*) said amplifying device being responsive to said first and second electrical signals to generate in said primary winding a signal of frequency $f_2$ and having an envelope corresponding to said desired waveform of said first signal;
   - (*g*) and detection circuit means coupled to said secondary winding for detecting a high level signal of frequency $f_1$ and having a waveform corresponding to said desired waveform.

2. A circuit arrangement for generating a high level deflection voltage of relatively low frequency comprising:
   - (*a*) a first source of a first electrical signal of frequency $f_1$ and desired waveform;
   - (*b*) a second source of a second electrical signal of relatively higher frequency $f_2$;
   - (*c*) electrical signal generating means comprising a single transistor amplifying device having emitter, base, and collector electrodes, a transformer having primary and secondary windings, and a source of operating potential for said amplifying device;
   - (*d*) said transformer wound for providing a voltage step-up from said primary to secondary winding and having said primary winding connected to said collector electrode;

(e) means connecting said first source to said base electrode and said second source to said emitter electrode;

(f) said amplifying device being responsive to said first and second electrical signals to generate in said primary winding a signal of frequency $f_2$ and having an envelope corresponding to said desired waveform of said first signal;

(g) and detection circuit means coupled to said secondary winding for detecting a high level signal of frequency $f_1$ and having a waveform corresponding to said desired waveform.

3. In an electrical receiving apparatus having an electron beam display device and means providing horizontal deflection of the electron beam at a frequency $f_2$, a circuit arrangement for generating a high level sawtooth vertical deflection voltage for the device comprising:

(a) a first source of a first electrical signal of sawtooth waveform and a desired vertical deflection frequency $f_1$;

(b) a second source of a second electrical signal of horizontal deflection frequency $f_2$;

(c) signal generating circuit means comprising a single transistor having emitter, base, and collector electrodes, a transformer having primary and secondary windings, and a source of operating potential for said device;

(d) said transformer wound for providing a voltage step-up from said primary to secondary winding;

(e) means direct-current coupling said primary winding between said source of operating potential and said collector electrode;

(f) means connecting said first source to said base electrode;

(g) a transformer coupling said second source to said emitter electrode;

(h) and detection circuit means including a rectifier and RC load coupled to said second winding for providing a high level deflection voltage of frequency $f_1$ and having a waveform corresponding to the waveform of said second signal.

4. In an electrical receiving apparatus having an electron beam display device and means providing horizontal deflection of the electron beam at a frequency $f_2$, a circuit arrangement for generating a high level sawtooth vertical deflection voltage for the device comprising:

(a) a first source of a first signal of vertical deflection frequency $f_1$ having a sawtooth waveform;

(b) a second source of a second signal of horizontal deflection frequency $f_2$;

(c) a transistor amplifying device having base, emitter, and collector electrodes;

(d) a source of operating potential for said device;

(e) a first transformer having primary and secondary windings and a large voltage step-up ratio from primary to second winding;

(f) means direct-current coupling said primary winding between said source of operating potential and said collector electrode;

(g) a coupling transformer having a primary and secondary winding and a voltage step-down ratio from said primary to secondary winding;

(h) means direct-current coupling said secondary winding of said coupling transformer to said emitter electrode;

(i) means connecting said second source to said primary winding of said coupling transformer;

(j) means connecting said first source to said base electrode; and (k) detection circuit means coupled to the secondary winding of said first transformer for providing a high level output deflection voltage of frequency $f_1$ and having a waveform corresponding to the waveform of said first signal.

5. In an electrical receiving apparatus having an electron beam display device and means providing horizontal deflection of the electron beam at a frequency $f_2$, a circuit arrangement for generating a high level sawtooth vertical deflection voltage for the device comprising:

(a) a transistor amplifying device having base, emitter, and collector electrodes;

(b) a source of operating potential for said device;

(c) a first transformer having primary and secondary windings and a large voltage step-up ratio from primary to secondary winding;

(d) means direct-current coupling said primary winding between said source of operating potential and said collector electrode;

(e) means biasing said transistor in a normally conducting state;

(f) a first source of a first signal of vertical deflection frequency $f_1$ having a sawtooth waveform;

(g) means connecting said first source to said base electrode;

(h) a second source of a second signal of horizontal deflection frequency $f_2$, said second signal having an amplitude for periodically driving said transistor into a state of substantially reduced collector current conduction when coupled to said emitter electrode;

(i) resonant circuit means including the equivalent capacitance and inductance of said primary winding of said first transformer, said resonant circuit means being resonant at a frequency greater than $f_2$;

(j) a coupling transformer having a primary and secondary winding and a voltage step-down ratio from said primary to secondary winding;

(k) means direct-current coupling said secondary winding of said coupling transformer to said emitter electrode;

(l) means coupling said second signal from said source to said primary winding of said coupling transformer; and (m) detection circuit means coupled to the secondary winding of said first transformer for providing a high level output deflection voltage of frequency $f_1$ and having a waveform corresponding to the waveform of said first signal.

References Cited by the Examiner

UNITED STATES PATENTS 3,081,405 3/63 Hovey et al. ---------- 307—88.5

ROY LAKE, *Primary Examiner.*

NATHAN KAUFMAN, *Examiner.*